United States Patent [19]
Leiser et al.

[11] Patent Number: 5,985,433
[45] Date of Patent: Nov. 16, 1999

[54] HIGH TEMPERATURE RESISTANT ORGANOPOLYSILOXANE COATING FOR PROTECTING AND REPAIRING RIGID THERMAL INSULATION

[75] Inventors: Daniel B. Leiser; Ming-ta S. Hsu; Timothy S. Chen, all of San Jose, Calif.

[73] Assignee: The United States of America as represented by the Administrator of the National Aeronautics and Space Administration, Washington, D.C.

[21] Appl. No.: 08/823,665

[22] Filed: Mar. 13, 1997

[51] Int. Cl.[6] .................................................. B32B 3/26
[52] U.S. Cl. ..................... 428/312.6; 428/307.3; 428/318.6; 428/319.1; 428/447; 428/688
[58] Field of Search ............................. 428/307.3, 312.6, 428/318.6, 319.1, 447, 688

[56] References Cited

U.S. PATENT DOCUMENTS

| | | | |
|---|---|---|---|
| 3,772,065 | 11/1973 | Seiler | 117/123 C |
| 4,093,771 | 6/1978 | Goldstein et al. | 428/312 |
| 4,352,894 | 10/1982 | Schmidt | 521/91 |
| 4,358,480 | 11/1982 | Ecord et al. | 427/140 |
| 4,517,375 | 5/1985 | Schmidt | 556/463 |
| 5,073,195 | 12/1991 | Cuthbert et al. | 106/2 |
| 5,074,912 | 12/1991 | Liles et al. | 106/2 |
| 5,205,860 | 4/1993 | Narula et al. | 106/2 |
| 5,296,288 | 3/1994 | Kourtides et al. | 428/262 |

*Primary Examiner*—Helen L. Pezzuto
*Attorney, Agent, or Firm*—Robert M. Padilla; Harry Lupuloff; John G. Mannix

[57] ABSTRACT

Ceramics are or protected from high temperature degradation, including high temperature, oxidative, aeroconvective degradation by a high temperature and oxidation resistant coating of a room temperature curing, hydrolyzed and partially condensed liquid polyorganosiloxane applied to the surface of the ceramic. The liquid polyorganosiloxane is formed by the hydrolysis and partial condensation of an alkyltrialkoxysilane with water or a mixture of an alkyltrialkoxysilane and a dialkyldialkoxysilane with water. The liquid polyorganosiloxane cures at room temperature on the surface of the ceramic to form a hard, protective, solid coating which forms a high temperature, oxidation resistant ceramic upon exposure to a high temperature environment, and is also used as an adhesive for adhering a repair plug in major damage to the ceramic. This has been found useful for protecting and repairing porous, rigid ceramics of a type used on reentry space vehicles.

18 Claims, 1 Drawing Sheet

HIGH TEMPERATURE RESISTANT ORGANOPOLYSILOXANE COATING FOR PROTECTING AND REPAIRING RIGID THERMAL INSULATION

ORIGIN OF THE INVENTION

The invention described herein was made in the performance of work under a NASA contract and is subject to Public Law 95-517 (13 U.S.C. 2000 et seq.). The contractor has not elected to retain title in the invention.

BACKGROUND OF THE INVENTION

1. Field of the Invention

The invention relates to a high temperature and oxidation resistant organopolysiloxane coating useful for repairing, bonding and for protecting porous thermal insulation from aeroconvective thermal degradation. More particularly, the invention relates to a room temperature curing, liquid organopolysiloxane polymer which contains unreacted silanol groups useful for repairing, bonding and for protecting porous ceramic insulation from aeroconvective thermal degradation and to the repaired, bonded or coated ceramic as a composite. On exposure to a high temperature environment, the coating forms an oxidation resistant, protective ceramic. The organopolysiloxane polymer is formed by the hydrolysis and partial condensation of di- and trifunctional organoalkoxysilanes with water.

2. Background of the Disclosure

Reentry space vehicles, such as the space shuttle which must leave and reenter the earth's atmosphere, require exterior thermal protection. The successful operation of the space shuttle required the development of light weight and very thermally efficient exterior thermal protection systems which have to withstand a wide variety of environments. These thermal protection systems (TPS) are in the form of rigid surface insulation in areas of high temperature (1000–1400° C.), flexible blanket insulation in areas of moderate high temperature (below 1000° C.) and oxidation protected, reinforced, rigid carbon/carbon in areas of severe temperatures (1400–1600° C.). Thermal protection systems employ both flexible and rigid ceramic insulation, with the flexible insulation often comprising various layers fabricated of ceramic fibers and which may or may not include layers of metal foil. The space shuttle requires a light weight and very thermally efficient, rigid and flexible exterior TPS which has to withstand a wide variety of environments, including temperatures of from 1000–1600° C. Ceramic materials currently in use or in development for such (TPS) include high purity silicon dioxide, aluminum oxide, silicon carbide, aluminosilicates, aluminoborosilicates and zirconium diboride as illustrative, but nonlimiting examples. In order to be both light weight and thermally protective, these ceramics and ceramic composites are very porous, often having a void volume of over 90%.

This porosity creates problems. One problem relates to hot gas penetration into the ceramic in the high temperature aeroconvective environment encountered on reentry. If this occurs, it can fuse the substrate and overheat the outer skin of the vehicle under the insulation. Another problem relates to embrittlement of the insulation in the high temperature aeroconvective environment encountered during reentry, which makes it more susceptible to damage. Attempts to resolve these problems have included very costly, time consuming, difficult to apply and easily damaged glassy coatings of the type disclosed in U.S. Pat. Nos. 4,093,771 and 5,296,288 which cannot be applied to, and cured on, insulation while it is on a vehicle. Low density, porous and lightweight rigid silica tiles and rigidized refractory composites prepared from silica fibers, along with aluminosilicate and borosilicate fibers and the like, as disclosed in U.S. Pat. No. 4,148,962, are used over much of the shuttle's surface. The light weight and concomitant low density of these tiles result from the porous structure. The outer surface of these tiles is sealed by applying a glassy coating of the type disclosed in U.S. Pat. No. 4,093,771 to the outer surface before they are attached to the space shuttle. This glassy coating has good resistance to devitrification and thermal shock, exhibits a low surface catalytic effect in a high temperature aeroconvective environment and can be made with either a high or low emittance. However, it is brittle and can be damaged by handling, hail, impact with space debris and the like. Attempts to resolve this problem have included costly, time consuming, difficult to apply and easily damaged glassy coatings of the type disclosed in U.S. Pat. No. 5,296,288 which has not yet met with much success. Therefore, a need exists for a better material to protect the thermal insulation and for a better method of repairing damage to both the glassy coating and to the insulation itself Therefore, there is still a need for a facile method and material for coating and also for sealing rigid porous insulation of a TPS against a high temperature aeroconvective environment.

SUMMARY OF THE INVENTION

The invention relates to applying a curing, liquid organosiloxane polymer (organopolysiloxane) having unreacted silanol groups, and which may contain one or more suitable fillers, to the surface of thermal insulation. This material cures to a hard coating at room temperature, which protects the insulation from thermal and oxidative degradation, and impact damage. The liquid polymeric material is also useful for bonding insulation and for repairing damage to the surface of the insulation. The coating of the invention has greater resistance to impact damage than the prior art glassy coatings referred to above. When exposed to a high temperature environment, including a high temperature, oxidative and aeroconvective environment, the coating forms an oxidation resistant and thermally stable protective ceramic on the insulation. It has been found useful as a high temperature and oxidation resistant, protective coating for ceramic insulation, including rigid, porous ceramic insulation of the type used on a space shuttle. Further, the oxidation resistant ceramic formed by pyrolysis of the cured oganopolysiloxane coating is a black, glassy material which is believed to be a silicon oxycarbide and which has been found to be useful as a high temperature and oxidation resistant emittance agent, which can be ground into pigment size particles and added to the coating as a filler to increase its emittance. The liquid organopolysiloxane coating material which is applied to the surface of the ceramic is obtained by the hydrolysis and partial condensation of one or more di- and trialkoxyfunctional organosilanes with water, wherein the functionality of the silane resides in the alkoxy groups attached to the silicon atom. The partial condensation means that the liquid organopolysiloxane material has unreacted silanol groups. Di- and trialkoxyfinctional organosilanes useful in the practice of the invention have the formulae $RR'Si(OR'')_2$, $RSi(OR'')_3$ and mixture thereof, wherein R, R' and R'' are the same or different alkyl group having from 1–4, preferably 1–3 and still more preferably 1–2 carbon atoms. It is particularly preferred that R' be either H (hydrogen) or $CH_3$. By organosiloxane is meant that the organopolysiloxane is formed from one or more siloxanes which contain at least one Si-C group and as set forth above, the siloxanes useful in the practice of the invention all contain at least one Si-C group. The mole ratio of dialkyldialkoxysilane or silanes to the alkyltrialkoxysilane or silanes in the reaction mixture will range from about 0–0.2. The liquid organopolysiloxane precursor material which is applied to the surface of the ceramic is not completely polymerized and is an aqueous solution of low molecular weight material which contains unreacted silanol groups and which, when applied to a substrate and permitted to cure at room temperature, forms a soft solid coating which continues to cure at room temperature and becomes a hard organopolysiloxane coating. The continued curing occurs by condensation of the unreacted silanol groups. This liquid precursor is applied by spray, brush, roller, flow and the like as a conventional organic coating material. While formation of the hard coating will occur at room temperature, curing may be accelerated at elevated temperature if desired. Another aspect of the invention resides in the relatively low toxicity of the water/alcohol solutions of the precursor material used in the practice of the invention, due to the absence of more toxic solvents such as toluene, xylene, naphthas, lacquer thinner and the like. Illustrative, but nonlimiting fillers and/or emittance agents useful for the coating, repair or bonding material of the invention, include one or more of silica, silicon oxycarbide, boria, alumina, silicon carbide, aluminoborosilicates, metal borides, aluminosilicates, molybdenum disilicide, refractory metals, and the like.

In the case of a porous ceramic, in one embodiment the hydrolyzed and partially condensed precursor, with or without the addition of one or more fillers, in a mixture of alcohol and water is diluted and applied as a watery coating material which coats the interior surface of the ceramic, but which does not form a continuous coating on the outer surface to seal the outer surface to inhibit hot gas from entering into the ceramic and the underlying support structure. After curing, the coating or repair material of the invention also waterproofs the insulation and prevents moisture and rain from entering into the interior of the porous ceramic structure of the insulation. In another embodiment, the precursor material, with or without the addition of one or more fillers, is applied as a viscous liquid to form a hard, continuous coating on the external surface of the porous ceramic, thereby sealing it and preventing rain, moisture, gas and the like from entering into and through the interior of the porous ceramic structure. In yet another embodiment, the precursor material is applied to both the interior and exterior surfaces of the ceramic.

Another embodiment of the invention relates to a method for repairing both surface damage to the ceramic and also damage which extends into the ceramic to such an extent that it can't be repaired by applying the precursor material as a thick paste. In the first case, a viscous solution of the liquid organopolysiloxane is applied to the damaged surface area. In the second case, the damaged section of the rigid insulation is cut into a shape suitable for receiving a plug of the ceramic material of the same shape, and a thick or viscous solution of the precursor material, with or without the addition of fillers, is used as an adhesive to cement the repair plug into the damaged tile as is explained in detail below.

BRIEF DESCRIPTION OF THE DRAWINGS

FIG. 2(a) is a partial cross-sectional view of illustrating the damaged area of the tile after being cut to a cylindrical shape, while

DETAILED DESCRIPTION

Figure 1:
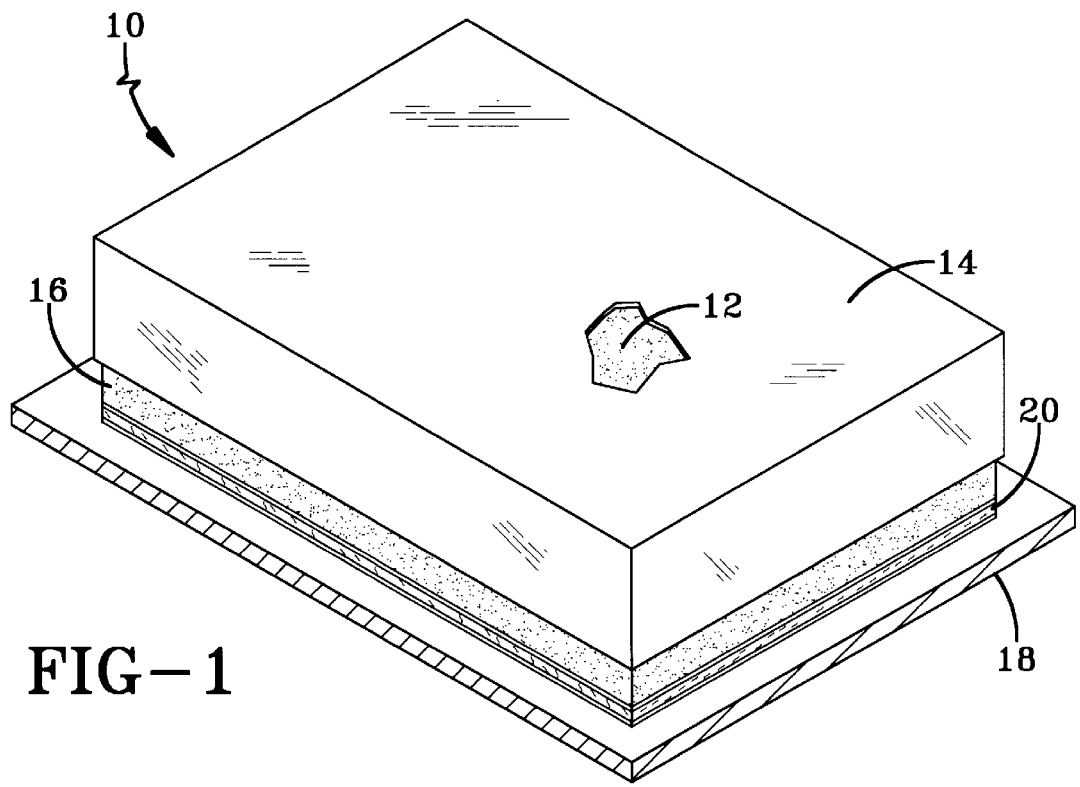
FIG. 1 is a simplified pictorial representation of a damaged, glass coated porous ceramic tile attached to the metal outer skin of a space shuttle.

A ceramic formed by pyrolysis of the organopolysiloxane of the invention is a black, glassy material useful as a filler or as a high temperature resistant emittance agent, which can be added to a coating of the invention to increase its emittance. The organosilicone coating, repair material and adhesive of the invention is formed from a precursor liquid obtained by the hydrolysis and partial condensation of one or more di- and trialkoxy functional organosilanes of the formulae $RR'Si(OR'')_2$, $RSi(OR'')_3$ and mixture thereof, wherein R, R' and R'' are the same or different alkyl group having from 1–4, preferable 1–3 and still more preferably 1–2 carbon atoms. It is particularly preferred that R' be either H (hydrogen) or $CH_3$. By organopolysiloxane is meant a polymer formed by the hydrolysis and at least partial condensation of one or more of these alkoxyfunctional organosilanes having at least one Si-C group as shown above. Thus, siloxanes useful in forming the precursor materials of the invention comprise at least one of alkyltrialkoxysilane, alkyldialkoxysilane and dialkyldialkoxysilane in which the alkyl group has no more than four carbon atoms. The mole ratio of alkyldialkoxysilane and/or dialkyldialkoxysilane or silanes, to the alkyltrialkoxysilane or silanes in the reaction mixture, will range from about 0–0.3 and preferably 0–0.2. By way of an illustrative, but nonlimiting example, liquid precursor coating materials applied to the surface of ceramics to form hard, organopolysiloxane coated ceramic of the invention have been made from the hydrolysis and partial condensation of (i) an alkyltrialkoxysilane, (ii) a mixture of an alkyltrialkoxysilane and an alkyldialkoxysilane, and (iii) a mixture of an alkyltrialkoxysilane and a dialkyldialkoxysilane in all of which a stoichiometric amount of water was used to effect the hydrolysis and partial condensation to form the organopolysiloxane solution. The partially condensed, liquid polymeric or oligomeric organopolysiloxane possesses unreacted silanol groups. In the practice of the invention it is preferred that the silicone precursor material be a copolymer based on the hydrolysis and condensation of a mixture of an alkyl trialkoxysilane and from about 5–25 wt. % of a dialkyldialkoxysilane or alkyldialkoxysilane based on the total amount of alkyltrialkoxysilane and dialkyldialkoxysilane. The precursor material is formed by mixing one or more of the organoalkoxysilanes with water and is a low viscosity liquid which contains water, alcohol from the hydrolysis reaction and partially condensed, low molecular weight organosiloxane polymers or oligomers, and most probably oligomers. While a stoichiometric amount of water has been used to form the precursor materials, some departures from stoichiometry is permissible. However, it is important not to use too much water in an amount sufficiently greater than the stoichiometric amount required or a gel and not a solution will be formed. The formation of a gel is beyond the scope of the invention and a gel cannot be used as either a precursor material or to form an organopolysiloxane coating of the invention. The shelf life of the liquid precursor varies from about a week to several months depending on the temperature, the nature of the silanes, and the amount of water and alcohol present. A precursor material made from one or more dialkoxysiloxanes has a longer shelf life than if a trialkoxysiloxane is used and an alkyldialkoxysilane produced material has a shorter shelf life than a dialkyldialkoxysilane produced material. For example, a precursor material prepared from a mixture of methyltrimethoxysilane and methyldimethoxysilane is less stable than one prepared from methyltrimethoxysilane alone or mixed with dimethyldiethoxysilane.

When the solvents (alcohol and water) in the polymeric precursor material evaporate at either ambient or elevated temperature, a viscous liquid forms first. The amount of viscous liquid is from about 40–52 wt. % of the original solution. While not wishing to be held to any particular theory, it is believed that some of the unreacted silanol groups attach themselves to the surface of the ceramic by secondary and/or primary bonding, including van der Walls forces. This viscous liquid then turns into a soft solid as polymerization continues through continued condensation of the silanol groups and finally turns into a hard, solid polyorganosiliane. This polyorganosiliane is a transparent material, provided emittance agents or other solid, light opaque, particulate matter have not been mixed into the liquid solution. The viscous liquid is useful as an adhesive, with or without a filler, for gluing pieces of ceramic together and for repairing damaged porous ceramic thermal protection material as is set forth in detail below. The actual viscosity is a function of the amount of water and alcohol present, fillers and degree of polymerization of the precursor material. The precursor material is not completely polymerized and is an aqueous solution of low molecular weight material which, when applied to a substrate and permitted to cure, forms a soft solid coating which continues to cure at ambient conditions and become a hard coating which is insoluble in water and organic solvents. The amount of solid organosilicone coating material obtained from a precursor solution derived from mixing one or more alkylalkoxysilanes with a stoichiometric amount of water depends on the starting materials and will generally range from between 30–42 wt. % of the total coreactants present, including the water. The alcohol present is formed by the hydrolysis. For example, reacting methyltrimethoxysilane with a stoichiometric amount of water gives a theoretical yield of 35.3 wt. % of the coreactants of a completely cross-linked polymethylsilsesquioxane solid [(MeSiO$_{1.5}$)n] according to the following reaction:

nMeSi(OMe)$_3$+3nH$_2$O→(MeSiO$_{1.5}$)n+3nMeOH+1.5nH$_2$O

However, when permitted to cure at room temperature the yield varies from about 36–42 wt. % due to the presence of uncondensed hydroxyl groups.

When the cured, solid organosilicone of the invention is pyrolyzed in an inert atmosphere in a TGA at a heating rate of about 20° C./min. up to a temperature of from 1000–1200° C., a black, glassy solid ceramic is formed in an amount of about 85–95 wt. % of the organosilicone polymer, depending on the starting materials. TGA and elemental analysis have revealed that above 900° C. the organosilicone polymer undergoes a rearrangement process to give a black, glass ceramic (char) with the evolution of hydrogen, methane, ethane and the like, depending on the R and/or R' group attached to the silicon atoms, along with small silane or siloxane molecules. The composition of the black, glassy ceramic is SiO$_x$C$_y$, wherein x=1.5–2 and y=0.2–1. This black ceramic has been found to remain black in color when heated to 1000–1500° C. in air for over 24 hours and does not melt or shrink at temperatures as high as 1500° C. This black ceramic can be ground into pigment size (≦~325 mesh) particles and used as an excellent emittance agent or filler in the organosilicone coating of the invention for increasing its emittance. This material is better than many conventional emittance agents and is mixed into the liquid precursor material used to form the organosilicone coating. Other emittance agents can be used such as silicon borides (SiB$_4$ or SiB$_6$), molybdenum, disilicide, carbon, silicon carbide, etc. However, molybdenum disilicide and silicon carbide are not black. Silicon borides are black, but they oxidize in air at high temperatures to form a mixture of silica and boria, which melts and forms small droplets in the glassy ceramic matrix formed by the pyrolysis of the organosilicone coating. The ceramic is resistant to oxidation at high temperatures and will typically contain from about 1–20 wt. % ccarbon.

The organosilicone coating of the invention was (see Examples 1–7) applied to the surface of a porous FRCI tile of the type disclosed above in place of the RCG glassy coating and tested with an arc jet which heated the coated surface of the tile up to 2300° F. and held at that temperature for five to ten minutes. It was observed that the coating of the invention withstood the high temperature aeroconvective environment at least as well as, and in some cases better than, the RCG glass coating. The organosilicone of the invention converts to a black, protective, glassy ceramic when exposed to such high temperatures in an amount of at least 87 wt. % of the original organosilicone coating and which maintains its integrity as a coating to prevent the hot gases from penetrating into the interior of the tile.

The method used to repair surface damage to a rigid, porous ceramic tile used on a space shuttle, such as a fibrous refractory composite insulation of the type disclosed in U.S. Pat. No. 4,148,962 made of rigidized refractory fibers such as silica and on its outer surface a protective glassy coating of the type disclosed in U.S. Pat. No. 4,093,771, depends on the nature and extent of the damage. If only the external glass coating is damaged, that section of the glassy coating can be sanded off to a smooth surface and then coated with the liquid organosilicone precursor material of the invention which may also contain one or more emitting agents, with or without other suitable fillers, dispersed in it. In this case the amount of precursor solution used is in the range of 0.5–2.0 g/in$^2$ of the surface and the amount of emittance agents and fillers present, if any, will be in the range of from about 0.01–0.4 g/in$^2$ of the surface. While a mild heating gun may be used to accelerate curing of the precursor liquid to the organosilicone coating, if desired, the coating material will cure within three days at ambient conditions to form a strong, hard coating. The final coating weight is in the range of from 0.2–1 g/in$^2$ which is the same as the RCG coating. Therefore, the coating of the invention does not add any weight to the rigid tile beyond what it originally had with the RCG coating. Another advantage of the coating of the invention is that it penetrates about 0.1 inches into the porous tile. After a tile has received such a repair, it does not require further repair unless it receives surface damage greater than about one-tenth of an inch deep. In the case of deeper damage (less than ½ inch depth), the precursor material is used as a viscous liquid with a high temperature resistant filler to fill the hole. As set forth above, illustrative but non-limiting examples of suitable fillers include one or more of silica, silicon oxycarbide, boria, alumina, silicon carbide, aluminosilicates, aluminoborosilicates, metal borides, molybdenum disilicide and the like. This includes powdered ceramic insulation filler obtained by grinding the black, glassy pyrolysis product of the polyorganosiloxane of the invention. The specific filler or filers chosen will be a function of the composition of the ceramic insulation and the environments to which it is esposed. The filled material cures to a hard, black solid coating which is more damage resistant than the RCG glassy coating. For repairing deeper holes a plug is used.

Referring to FIG. 1, tile 10 having a damaged area 12 which extends beyond the protective glass coating 14 and into the body of the underlying porous ceramic 16 is shown attached to the metallic outer surface of a space shuttle. Porous ceramic 16 is a fibrous refractory composite insulation (FRCI) of the type disclosed in U.S. Pat. No. 4,148,962 made of rigidized silica or aluminoborosilicate fibers and mixture thereof having a 90% void volume. The porous ceramic is cut or machined to precise dimensions and coated with a glass protective coating 14 typically of the type disclosed in U.S. Pat. No. 4,093,771. The glass coating is generally applied and cured by the tile manufacturer, as it is formed from a slurry by heating to a temperature of 2100° F. or more to fuse the components and form the glass. Depending on its location on the space shuttle, the glass coating is either dark or white to be heat absorbing and emitting, or reflective. This is achieved by incorporating the desired emittance agent into the glass coating composition as is known to those skilled in the art. Tile 10 is attached to the metal surface by means of a thermally resistant felt pad 20 adhesively attached to the tile and metal by means of thin layers of a heat resistant adhesive 22, such as the silicone adhesive disclosed in U.S. Pat. No. 4,338,368. The felt layer acts as a strain relief for the tiles to relieve any stress caused by the difference in the thermal coefficient of expansion between the tile and metal substrate, as well as mechanical deflections occurring from takeoff, flight and landing stresses.

Figure 2A:
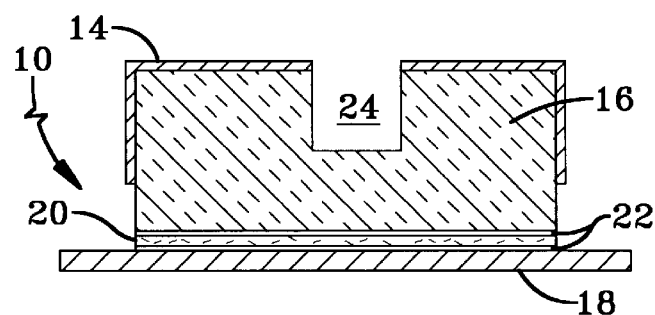
Figure 2B:
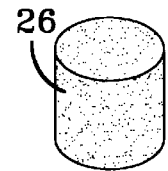
FIG. 2(b) is a perspective of a cylindrical plug used to repair the damaged tile.
Figure 3:
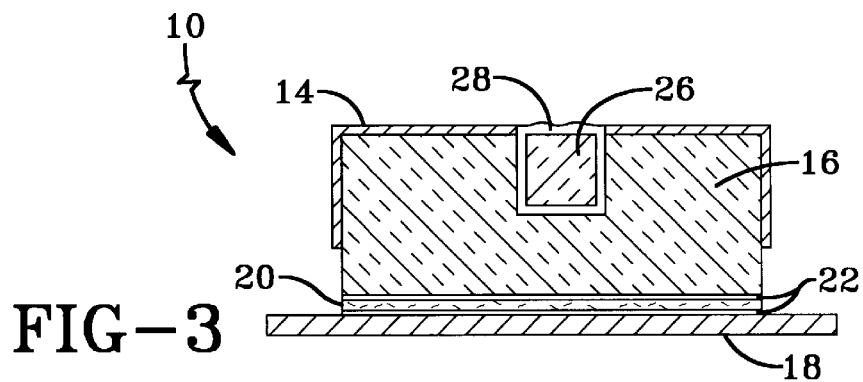
FIG. 3 is a partial cross-sectional view showing the tile repaired with the plug and in which the coating precursor material is used both as an adhesive to cement the plug into the tile and to coat the outer surface.

If the damage is deep into the tile, the damaged area 12 is cut into a suitable shape, such as the cylindrical shape illustrated in cross-section in FIG. 2 (a), and a corresponding, mating repair plug 26 is coated on its bottom and side with a viscous, liquid organopolysiloxane solution of the invention (with or without fillers) or a suitable silicone material, such as a silicone adhesive of the type used to adhere the tile to the shuttle. Alternatively, and at the discretion of the practitioner, the interior surface of the modified damage area is coated with the solution (with or without fillers) or a silicone and the plug inserted into the corresponding mating cavity 24 formed in the tile. The surface of the repaired area is then coated with a dilute solution of the invention 28 as generally illustrated in FIG. 3. The repaired area can then be heated by any suitable means, such as a heat gun, to accelerate curing of the adhesive and organopolysiloxane coating, if desired. The coating will have a white, heat reflecting agent, such as silica power, or a black emittance agent such as silicon diboride, or it will have no emittance or heat reflecting agent, depending on its location on the space shuttle. This is determined by the practitioner.

The invention will be further understood with reference to the examples below.

EXAMPLE 1

In this example the liquid precursor solution was prepared by adding distilled or deionized water to methyltrimethoxysilane in a mole ratio of 3:1 (about 2:5 wt. ratio). The mixture was shaken overnight to form a clear, homogeneous solution containing partially condensed polymethylsiloxane polymer, water and alcohol. The shelf life of this solution was found to be about 1–3 months, which can be extended by adding any low molecular weight alcohol such as methanol, ethanol, propanol as a diluent. The so-formed polymer solution, if diluted, was diluted with a 1:1 wt. ratio of ethanol to water and the diluted solution then mixed with various emittance agents and/or fillers shown in the Table, by shaking the filler (pigment)-containing solution in a closed glass jar for a few minutes. This was then spread onto the surface of a rigid, porous FRCI ceramic tile fabricated of rigidized silica fibers in an amount of 1–2 g of the solution per square inch of tile surface, air dried and permitted to cure for three days at room temperature to form a hard, black organosilicone coating on the tile. The dry coating was present on the surface in an amount of from 0.1–1 g/in$^2$ and contained the emittance agents or agent (mixture of SiB$_6$ and MoSi$_2$, or SiC$_x$O$_y$, derived from the pyrolysis of an organopolysiloxane polymer of the invention in an amount of from 0.02–0.2 g/in$^2$. When heated at 1000° C. in air or argon for from 2 minutes to one hour, the weight loss of the coating was only 15%, leaving 85% of the hard, black protective ceramic coating on the outer surface of the tile. Continued heating for 24 hours didn't result in any significant weight change in the coating. The results of these experiments are shown in Table 1 below.

In further experiments, some of the alcohol and water present in the polymer solution formed by the hydrolysis and condensation was evaporated to produce a viscous liquid (45–55% of the original weight). This viscous precursor liquid was successfully used as an adhesive both with and without fillers as an adhesive to glue the tile plug or glue two tiles together, and/or used as a repairing paste to repair and fill small holes and chips in the surface of various samples of tiles, and/or applying a protective surface coating on the surface of the tile. One or more fillers and/or emittance agents are preferably incorporated into the viscous liquid (e.g., 20–70%) to improve the strength of the coating and the ceramic formed after pyrolysis or exposure to a high temperature environment.

TABLE 1

| Sample No. | Concentration % of original solution | Coating wt., g/in$^2$ of tile surface | Emitting agents/filler, g/in$^2$ of tile surface | Dry coating wt., g/in$^2$ | Coating wt., g/in$^2$ of tile 1000° C. | Coating wt., g/in$^2$, 1000° C., air |
|---|---|---|---|---|---|---|
| A | 50 | 2 | SiB$_6$, 0.03 | 0.42 | 0.36(argon) | 0.37(2 hr.) |
|   |   |   | MoSi$_2$, 0.036 |   | 0.38(air) | 0.39(2 hr.) |

TABLE 1-continued

| Sample No. | Concentration % of original solution | Coating wt., g/in² of tile surface | Emitting agents/filler, g/in² of tile surface | Dry coating wt., g/in² | Coating wt., g/in² of tile 1000° C. | Coating wt., g/in², 1000° C., air |
|---|---|---|---|---|---|---|
| B | 55 | 1.9 | $SiB_6$, 0.028 $MoSi_2$, 0.037 | 0.43 | 0.38(air) | 0.39(2 hr.) |
| C | 67 | 1.5 | $SiO_2$, 0.03 $Al_2O_3$, 0.01 | 0.45 | 0.41(air) | 0.41(2 hr.) |
| D | 34 | 1.5 | $SiB_6$, 0.05 $MoSi_2$, 0.01 | 0.28 | 0.26(argon) | 0.26(1 hr.) |
| E | 100 | 1.5 | $SiO_2$, 0.02 $B_2O_3$, 0.01 | 0.65 | 0.55(argon) | 0.55(24 hr.) |
| F | 100 | 1.5 | $SiC_XO_Y$, 0.05 | 0.64 | 0.56(air) | 0.56(2 hr.) |
| G | 100 | 1.2 | $SiC_XO_Y$, 0.01 $SiO_2$, 0.01 | 0.56 | 0.49(air) | 0.49(1 hr.) |

EXAMPLE 2

In this experiment the silicone polymer solution was prepared by adding 50.4 g distilled of deionized water (2.8 mole) to a mixture of 108.8 g of methyltrimethoxysilane (0.8 mole) and 21.2 g of methyldimethoxysilane (0.2 mole). Less time was required to shake this mixture to a clear, homogeneous polymer precursor solution than the solution in Example 1, as the methyldimethoxysilane accelerated the reaction. Accordingly, the shelf life of this solution is shorter than that of Example 1. The results of some of the tests are shown in Table 2 below.

As was the case for the viscous precursor liquid produced in Example 1, a viscous liquid formed by evaporating some of the water and alcohol was also successfully used as a tile adhesive and to repair and plug surface damage and holes in samples of the porous FRCI tiles.

EXAMPLE 3

In this experiment the precursor polymer solution was prepared by adding 52.2 g of the water (2.9 mole) to a mixture of 122.4 g of methyltrimethoxysilane (0.9 mole) and 10.6 g of methyldiethoxysilane (0.1 mole) and shaken for a few hours to achieve a clear, homogeneous solution to which emittance agents were added and the resulting dispersion applied to the surface of the FRCI tiles. As with Examples 1 and 2, the precursor solution is also useful for tile repair after evaporating some of the water and alcohol. The results of the experiments are shown in Table 3.

TABLE 2

| Sample No. | Concentration % of original solution | Coating wt., g/in² of tile surface | Emitting agents, g/in² of tile surface | Dry coating wt., g/in² | Coating wt., g/in² of tile 1000° C. | Coating wt., g/in², 1000° C., air |
|---|---|---|---|---|---|---|
| H | 100 | 1.11 | $SiC_XO_Y$/.05 | 0.42 | 0.38(argon) 0.38(air) | 0.38(2 hr.) 0.39(2 hr.) |
| I | 100 | 1.31 | $SiB_6$/.02 $MoSi_2$/.01 | 0.53 | 0.44(air) | 0.45(4 hr.) |

TABLE 3

| Sample No. | Concentration % of original solution | Coating wt., g/in² of tile surface | Emitting agents, g/in² of tile surface | Dry coating wt., g/in² | Coating wt., g/in² of tile 1000° C. | Coating wt., g/in², 1000° C., air |
|---|---|---|---|---|---|---|
| J | 50 | 1.9 | $SiC_XO_Y$/.05 | 0.41 | 0.36(argon) 0.36(air) | 0.38(2 hr.) 0.39(2 hr.) |
| K | 50 | 1.3 | $SiB_6$/.02 $MoSi_2$/.01 | 0.28 | 0.26(argon) 0.28(air) | 0.27(2 hr.) 0.26(1 hr.) |

EXAMPLE 4

The precursor solution for these experiments was prepared by adding 53.1 g of the water (2.95 mole) to a mixture of 129.2 g of methyltrimethoxysilane (0.95 mole) and 6.7 g of methyldiethoxysilane (0.05 mole) and the mixture shaken for several hours to obtain a clear, homogeneous solution which, when mixed with emittance agents, was used to coat the surface of the tile samples as in the previous examples. As is the case with the previous examples, this solution is useful as a repair paste and adhesive after being concentrated to a viscous solution. The results of the experiments are given in Table 4 below.

TABLE 4

| Sample No. | Concentration % of original solution | Coating wt., g/in² of tile surface | Emitting agents, g/in² of tile surface | Dry coating wt., g/in² | Coating wt., g/in² of tile 1000° C. | Coating wt., g/in², 1000° C., air |
|---|---|---|---|---|---|---|
| L | 67 | 1.5 | $SiC_xO_y$/.05 | 0.41 | 0.36(argon) | 0.37(2 hr.) |
| M | 67 | 1.5 | $SiB_6$/.02 $MoSi_2$/.02 | 0.40 | 0.36(argon) | 0.37(2 hr.) |

EXAMPLE 5

In these experiments 50.4 g of the water (2.8 mole) was added to a mixture of 108.8 g of methyltrimethoxysilane (0.8 mole) and 29.6 g of dimethyldiethoxysilane (0.2 mole) and shaken overnight to achieve a clear, homogeneous polymer solution which was then mixed with emittance agents and used to coat tiles as in the previous experiments. The results of some of the experiments are given in Table 5 below. As was the case for Example 1, a viscous solution formed by evaporating some of the water and alcohol was successfully used to adhere and repair damaged samples of the porous ceramic tiles.

TABLE 5

| Sample No. | Concentration % of original solution | Coating wt., g/in² of tile surface | Emitting agents, g/in² of tile surface | Dry coating wt., g/in² | Coating wt., g/in² of tile 1000° C. | Coating wt., g/in², 1000° C., air |
|---|---|---|---|---|---|---|
| N | 100 | 1.8 | $SiC_xO_y$/.05 | 0.67 | 0.58(argon) 0.58(air) | 0.58(2 hr.) 0.58(2 hr.) |
| O | 100 | 1.4 | $SiB_6$/.02 $MoSi_2$/.02 | 0.57 | 0.49(argon) | 0.49(2 hr.) |

EXAMPLE 6

In these experiments 52.2 g of the water (2.9 mole) was added to a mixture of 122.4 g of methyltrimethoxysilane (0.9 mole) and 14.8 g of dimethyldiethoxysilane (0.1 mole) and the mixture shaken overnight to produce a clear, homogeneous solution which was mixed with emittance agents and used to coat the surface of the tiles as in the previous examples. Some of the results are given in Table 6 below. The concentrated solution is also useful as a tile adhesive and for tile repair.

TABLE 6

| Sample No. | Concentration % of original solution | Coating wt., g/in² of tile surface | Emitting agents, g/in² of tile surface | Dry coating wt., g/in² | Coating wt., g/in² of tile 1000° C. | Coating wt., g/in², 1000° C., air |
|---|---|---|---|---|---|---|
| P | 100 | 1.5 | $SiC_xO_y$/.05 | 0.58 | 0.51(argon) 0.51(air) | 0.52(4 hr.) 0.52(2 hr.) |
| Q | 67 | 1.4 | $SiB_6$/.02 $MoSi_2$/.02 | 0.38 | 0.36(argon) | 0.37(2 hr.) |

EXAMPLE 7

In these experiments 53.1 g of the water (2.95 mole) was added to a mixture of 129.2 g of methyltrimethoxysilane (0.95 mole) and 6 g of dimethyldimethoxysilane (0.05 mole) and the mixture shaken overnight to produce a clear, homogeneous solution to which was added emattance agents and the solution then applied to the outer surface of the porous tiles. Some of the results are shown in Table 7 below. As with all the previous examples, the concentrated solution is useful for repairing damaged tiles and as a tile adhesive.

TABLE 7

| Sample No. | Concentration % of original solution | Coating wt., g/in² of tile surface | Emitting agents, g/in² of tile surface | Dry coating wt., g/in² | Coating wt., g/in² of tile 1000° C. | Coating wt., g/in², 1000° C., air |
|---|---|---|---|---|---|---|
| R | 67 | 1.5 | $SiC_xO_y$/.05 | 0.43 | 0.40(argon) | 0.41(4 hr.) |
| S | 67 | 1.4 | $SiB_6$/.02 $MoSi_2$/.02 | 0.35 | 0.30(argon) | 0.31(2 hr.) |

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. Silicon, oxygen containing ceramic composite with an improved surface, made by the method of
   1. applying an organopolysiloxane polymer solution to a porous, light weight, thermally protective ceramic substrate with a void volume of 70% to 90%, said polymer having unreacted silanol groups,
   2. drying the solvent, and
   3. allowing sufficient time for the polymer to cure.
2. The ceramic composite of claim 1, wherein the organopolysiloxane polymer is formed by the hydrolysis and partial condensation of one or more di- and trialkoxyfunctional organosilanes with water.
3. The ceramic composite of claim 2 wherein said the di- and trialkoxyfunctional organosilanes are present in the reaction mixture in a molar amount of said dialkoxysilane or silanes to said alkyltrialkoxysilane or silanes range from about 0–0.3.
4. The ceramic composite of claim 3 wherein said di- and trialkoxyfunctional organosilanes have the formulae RR'Si(OR")2, RSi(OR")3 and mixture thereof, wherein R, R' and R" are the same or different alkyl group having from 1–4 carbon.
5. The ceramic composite of claim 2, wherein the water is present in stoichiometric amounts.
6. The ceramic composite of claim 5, wherein water is present in a 2.8–3.0 mole ratio to alkylltrialkoxysliane and alkyldialkoxysilane or dialkyldialkoxysilane.
7. The ceramic composite of claim 2, wherein water is present in a 3.0 mole ratio to methyltrimethoxysliane.
8. The ceramic composite of claim 1, wherein the polymer solution further comprises one or more fillers or emittance agents.
9. The ceramic composite of claim 8, when the fillers or emittance agents include silica, silicon oxycarbide, boria, alumina, silicon carbide, aluminoborosilicates, silicon borides, other metal borides, aluminosilicates, molybdenum disilicide, and refractory metals or mixture thereof.
10. The ceramic composite of claim 1, wherein the solvent is a mixture of water and alcohol which dried by evaporation at ambient temperatures.
11. The ceramic composite of claim 1 wherein the ceramic substrate is a high purity silicon dioxide, an aluminum oxide, a silicon carbide, an aluminosilicates, an aluminoborosilicate, or a zirconium diboride.
12. The ceramic composite of claim 1, wherein a light weight, thermally protective ceramic composite is penetrated into the substrate, and is harder and more resistant to impact than its underlying material.
13. The ceramic composite of claim 12, wherein the surface penetrates from 0.1 mm–10 mm.
14. The ceramic composite of claim 12, wherein the surface penetrates from 0.5 mm–5 mm.
15. The ceramic composite of claim 12, wherein the surface penetrates from 1 mm–2.5 mm.
16. The protective ceramic composite of claim 1, wherein the polymer has a ceramic residue above 85%, and contains carbon.
17. The ceramic composite of claim 16, wherein the surface is high temperature oxidative stable and resistant to impact.
18. The ceramic composite of claim 1, wherein the surface is a black hard surface.

* * * * *